(12) United States Patent
Nakayama

(10) Patent No.: US 6,188,663 B1
(45) Date of Patent: Feb. 13, 2001

(54) RECORDING MEDIUM LOADING DEVICE

(75) Inventor: Keisuke Nakayama, Miyagi-ken (JP)

(73) Assignee: Alps Electric Co., Ltd. (JP)

(*) Notice: Under 35 U.S.C. 154(b), the term of this patent shall be extended for 0 days.

(21) Appl. No.: 09/159,329

(22) Filed: Sep. 23, 1998

(30) Foreign Application Priority Data

Oct. 2, 1997 (JP) .................................................. 9-269698

(51) Int. Cl.$^7$ .................................................. G11B 17/04
(52) U.S. Cl. .................................................. 369/178
(58) Field of Search .................................. 369/176, 178, 369/34, 36

(56) References Cited

U.S. PATENT DOCUMENTS

| | | | |
|---|---|---|---|
| 4,443,049 | 4/1984 | De Pommery et al. | 439/373 |
| 4,899,326 | 2/1990 | Takeya et al. | 369/36 |
| 5,281,160 | * 1/1994 | Walkup et al. | 439/266 |
| 5,574,705 | 11/1996 | Suzuki | 369/36 |
| 5,982,734 | * 11/1999 | Yamashita et al. | 369/178 |

FOREIGN PATENT DOCUMENTS

| | | |
|---|---|---|
| 0 374 684 A1 | 7/1988 | (EP) . |
| 0 637 026 A1 | 2/1995 | (EP) . |
| 0098174 | * 4/1989 | (JP) ...................................... 369/176 |
| WO 90/06579 | 6/1990 | (WO) . |

* cited by examiner

*Primary Examiner*—David L. Ometz
*Assistant Examiner*—Franklin D. Altman
(74) *Attorney, Agent, or Firm*—Brinks Hofer Gilson & Lione

(57) ABSTRACT

According to the present invention, when a disk package is inserted from an insertion port in X1 direction into a package loading area, an edge portion of a case comes into abutment with a receiving portion of a moving plate and moves from position (a) to position (b) together with the moving plate. At this time, a push-up piece of the moving plate pushes a to-be-pushed-up portion of a contact mechanism portion in Z2 direction, so that the contact mechanism portion is turned in β2 direction from position (c) to (d). As a result, contacts come into abutment and hence into electrical connection with connection terminals of the disk package. Since this abutment is effected immediately before the loading of the disk package is completed, the contacts slide slightly on the connection terminals. Therefore, the contacts and the connection terminals are rubbed against each other to effect cleaning thereof, thus making inconveniences such as contact defect difficult to occur and ensuring connection of the contacts with the connection terminals.

11 Claims, 9 Drawing Sheets

RECORDING MEDIUM LOADING DEVICE

BACKGROUND OF THE INVENTION

1. Field of the Invention

The present invention relates to a recording medium loading device for loading into the body of the device a package which contains a single or plural disks such as a CD, a CD-ROM, a DVD, and/or a PD, or a package which contains recording means other than disks.

2. Description of the Prior Art

Recently there has been proposed a disk unit which permits disks of different types to be loaded therein at a time. According to such a disk unit, both a disk for reproduction only and a recordable disk, such as a combination of CD or CD-ROM and DVD-RAM, or a combination of DVD-ROM and DVD-RAM, are housed within a single disk package and the package is loaded into the disk unit.

In such a disk unit, when the disk package has been loaded therein, it is necessary to recognize the type of each disk contained in the disk package, especially whether the disk is of a RAM type or a ROM type, as well as the contents recorded in each disk.

In such a case, TOC data, for example, of each of the loaded disks is read out using an optical head and determination is made as to the type of the disk and the contents of recorded information. Alternatively, the difference in thickness from the cover surface to the recording surface of the disk is detected or the track density is detected to determine the type of the disk. In this case, however, a long time is required from the time when the disk is loaded up to the time when its type is determined and a shift is made to a reproducing operation.

In this connection, if a memory board is attached to the disk package and the type of each disk and TOC data are stored beforehand in the memory board for each disk package, then when the disk package has been loaded into the disk unit, it is possible, by making access to the memory board, to grasp the types of all the disks contained in the disk package as well as the contents such as index information. In such a device, however, it is necessary that a connection terminal of the memory board attached to the disk package and a contact provided on the device body side be brought into contact with each other upon loading of the disk package into the device body.

Figure 9:
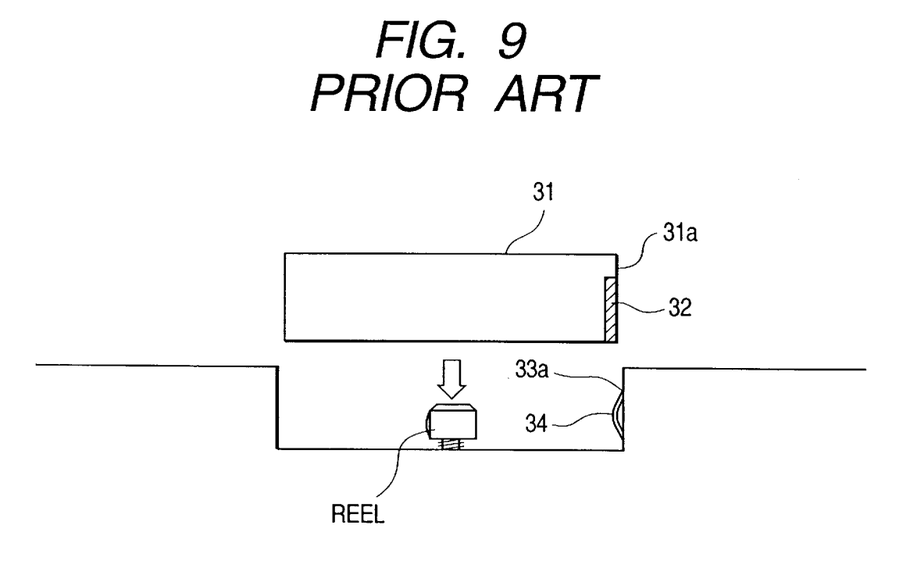
FIG. 9 is a partial sectional view showing a conventional example.

Heretofore, as a concrete example of connecting a connection terminal of the memory board mounted on the recording medium side with a contact provided on the device body side, there has been known such an example as shown in FIG. 9 in which a cassette tape of DVC is loaded onto the body of a digital video device.

FIG. 9 is a schematic sectional view showing a cassette holder of a digital video device body.

As shown in FIG. 9, a connection terminal 32 of a memory board is attached to a side end face 31a of a cassette tape 31 of DVC. On the other hand, on a side face 33a of the cassette holder is provided a contact 34 formed by a metallic plate spring or the like. In this example, the cassette tape 31 is inserted into the device body while the connection terminal 32 of the memory board slides on the contact 34 provided on the cassette holder side.

In the cassette holder shown in FIG. 9, however, the elastic force of the contact 34 acts as a resistance force during loading of the cassette tape 31, thus giving rise to the drawback that the cassette tape inserting load is large and so is the cassette tape ejecting load.

Moreover, if such a connection mechanism as shown in FIG. 9 is applied to a disk package loading structure in which the foregoing disk package containing plural disks is inserted longitudinally into the device body, the distance of the sliding motion between the wall surface of the inserted disk package and the contact becomes long, so that not only a load is imposed always on the disk package but also the contact slides a long distance on any other portion than the connection terminal of the cassette pack, for example the surface of a plastic wall. As a result, the plastic wall surface is scraped by the contact and hence not only the cassette pack is flawed but also the contact is stained, thus easily causing a defective connection between the contact and the connection terminal on the package side.

The problems involved in such a connection mechanism arise not only in a disk-containing package but also in a tape-containing package or a package containing a single or plural memory elements.

SUMMARY OF THE INVENTION

The present invention solves the above-mentioned problems of the prior art and it is an object of the invention to provide a recording medium loading device wherein a contact provided on the device body side is prevented from sliding long on any other portion than a connection terminal of the package when a package containing recording mediums such as disks is loaded into the body of the device, thereby diminishing the package insertion load and preventing the contact from being stained.

It is another object of the present invention to provide a recording medium loading device wherein, upon complete loading of the package, a connection terminal on the package side and a contact on the device body side come into sliding contact with each other, thereby permitting self-cleaning of the contact portions.

According to the present invention there is provided a recording medium loading device in which a connection terminal for connection with the exterior is provided in a package within which a recording medium is housed is provided, and the package is capable of being loaded into or unloaded from a body of the device, wherein in the device body are provided a contact support member having a contact and a moving member adapted to move in interlock with loading of the package, the contact support member being supported movably between a retracted position in which the contact is spaced apart from the package and a connecting position in which the contact is brought into contact with the connection terminal, the contact support member being the retracted position when the package is loaded into the device body and being moved to the connecting position by the moving member when the moving member moves after loading of the package.

In the present invention, during the package loading operation, the contact provided on the device body side is prevented from coming into sliding contact with the package surface, whereby the package inserting load can be diminished and there is no fear of the contact being stained by its sliding contact with the package surface. Thus, the connection between the contact and the package-side connection terminal can be ensured.

For example, a disk as a recording medium is housed within the package, and the package is provided with a discriminating means having the foregoing connection terminal to detect at least either the type of the disk or recorded contents of the disk.

Alternatively, a plurality of disks as recording mediums are accommodated within a package and the package is provided with a discriminating means having the foregoing connection terminal to detect at least either the type of each disk or recorded contents of each disk.

For example, the discriminating means is a memory board having a memory element. Alternatively, it may be of the type capable of expressing information of plural bits according to the number of connection terminals which are conductive with the contact.

The contact and the contact support member are opposed to the position where one side of the package to be loaded passes. Preferably, the contact support member moves to the connecting position immediately before the loading of the package into the device body is completed, and the contact and the connection terminal slide with respect to each other with the final loading motion of the package after contact of both contact and connection terminal.

Preferably, as will be described in the following paragraph of an embodiment, the package is inserted in parallel with a longitudinal direction (e.g. the disk surface direction), and the package is provided with a connection terminal on a side face thereof which extends in the package inserting direction. In this case, by moving the contact support member to its retracted position, it is possible to prevent the contact and the package wall surface from coming into sliding contact over a long distance.

Moreover, self-cleaning of the conductive portion can be expected by the sliding contact of the contact and the connection terminal at the final stage of package loading.

Further, for example, the moving member not only moves while being pushed by the package being loaded but also functions as an eject member for pushing out the package in the ejecting direction when the package after loading is unlocked.

Alternatively, the moving member may be an eject member which projects forward of the device when the package has been loaded and which is operated for ejection when the package is to be ejected, or it maybe a moving member of another mechanism.

DETAILED DESCRIPTION OF A PREFERRED EMBODIMENT

Figure 1:
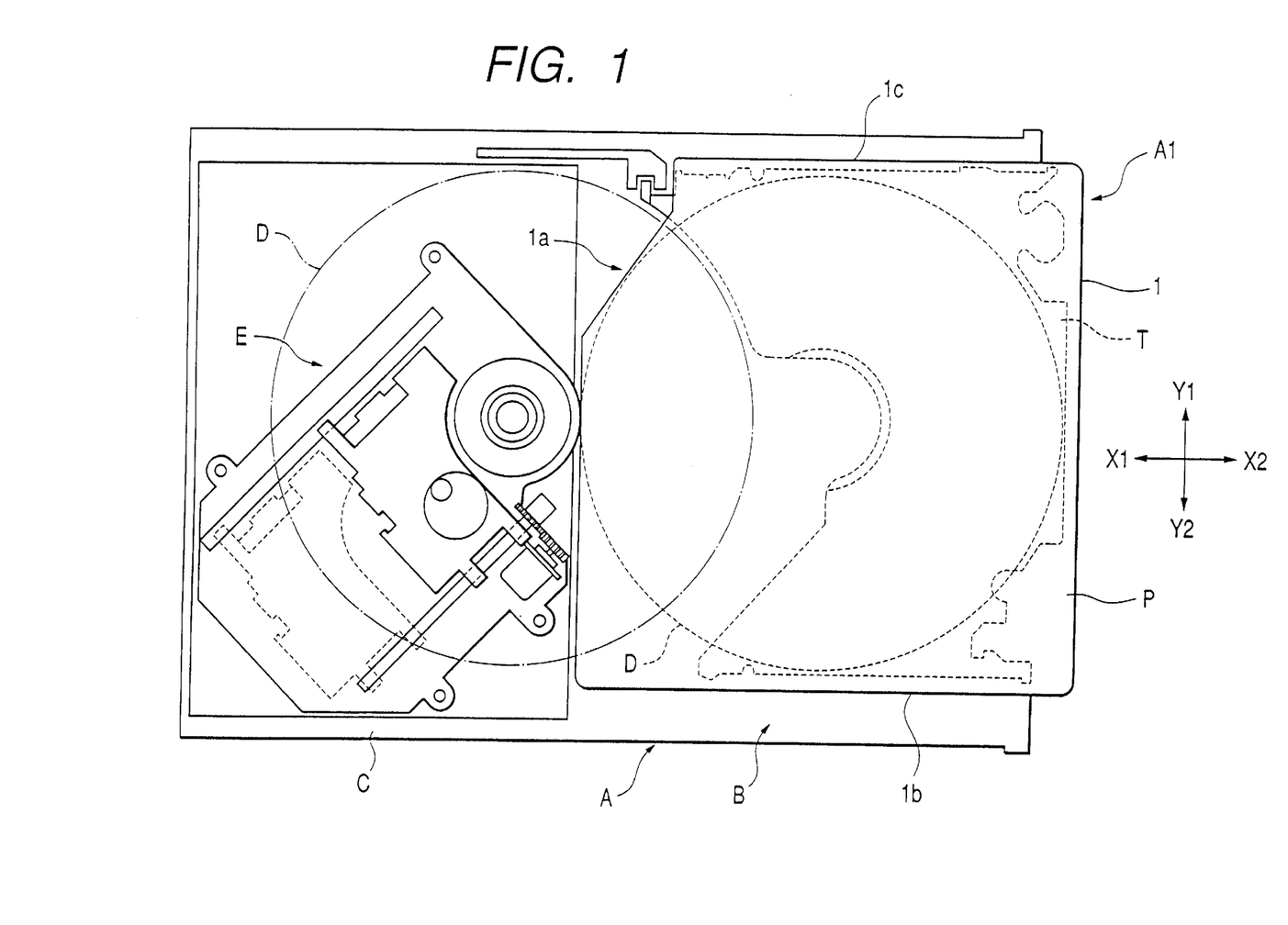
FIG. 1 is a sectional plan view of a disk unit according to an embodiment of the present invention.
Figure 2:
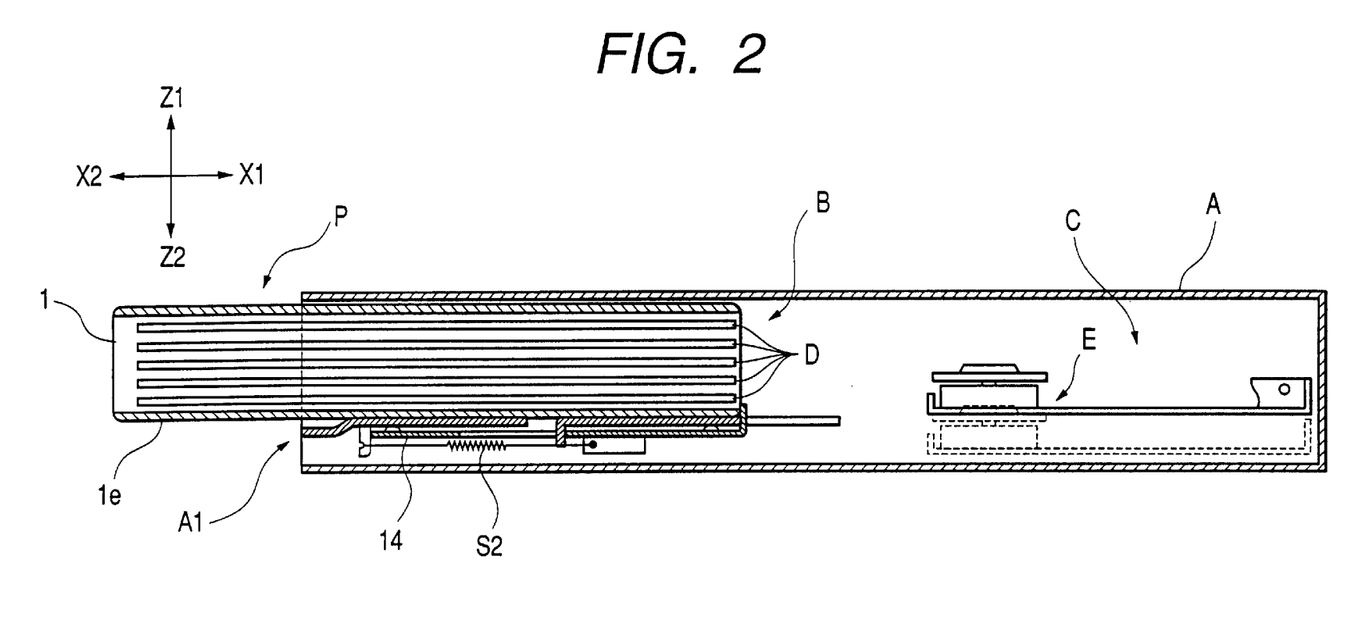
FIG. 2 is a longitudinal sectional view thereof.

FIG. 1 is a sectional plan view of a disk unit for loading therein of a disk package according to an embodiment of the present invention and FIG. 2 is a longitudinal sectional view thereof.

The disk unit shown in FIGS. 1 and 2 has a housing A which is rectangular in plan. In the interior of the housing A are provided a package loading area B for loading a disk package P and a disk driving area C. In the disk driving area C is disposed a disk drive means E for driving a disk D after drawn out from the disk package P.

The disk package P is inserted in X direction in FIGS. 1 and 2 into the housing A of the disk unit through an insertion port A1 formed in a longitudinally front position of the rectangular shape of the housing and is loaded into the package loading area B.

Figure 3:
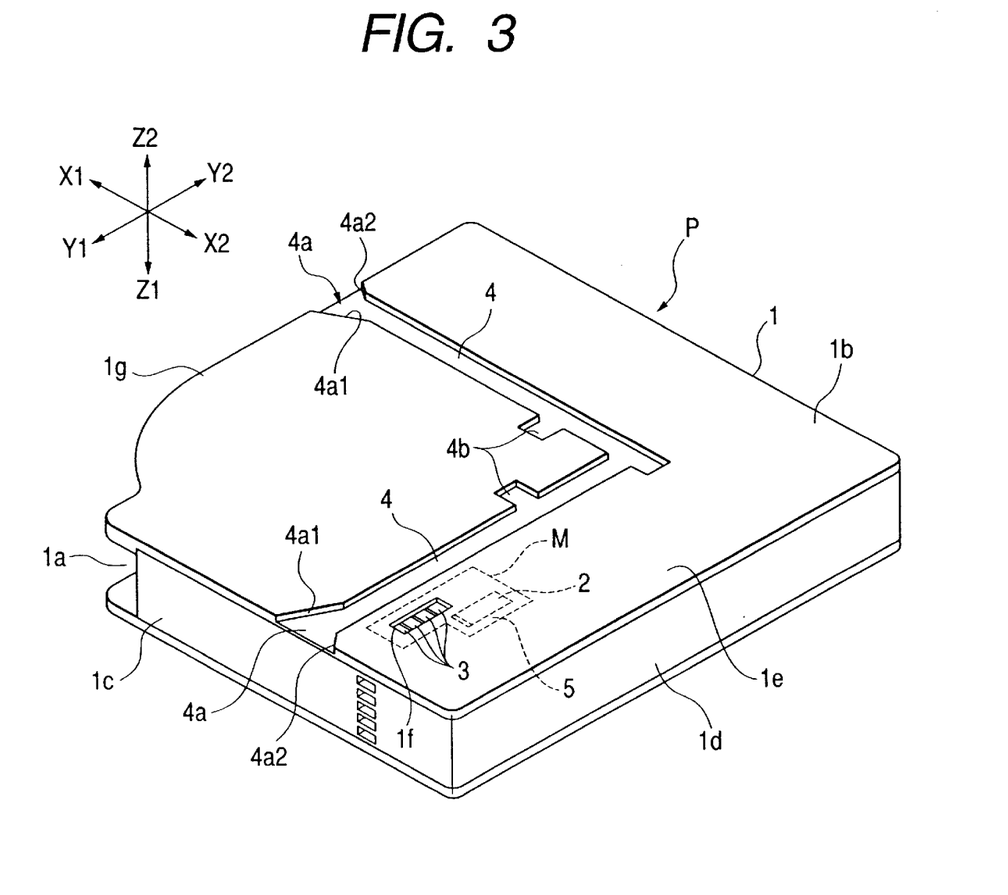
FIG. 3 is a perspective view of a bottom side of a disk package.

FIG. 3 is a perspective view showing the appearance of a bottom side of the disk package.

The disk package P is formed by a synthetic resin case 1, with an opening 1$a$ being formed on X1 side in the figure. The opening 1$a$ is for drawing out such tray T and disk D as indicated with dotted lines in FIG. 1. Through the opening 1$a$ there are performed delivery and receipt of the disk D with respect to the disk drive means E.

A plurality of horizontal ribs (not shown) are formed on the inner surfaces of both left side plate 1$b$ and right side plate 1$c$ of the case 1 so that both right and left side edges of the tray T are slidable in X direction while being guided by adjacent such ribs. In the interior of the case 1 are formed plural stages horizontal ribs and, for example, five trays T as shown in FIG. 2 are accommodated within the case so that they can be drawn out.

Within the disk package P in this disk unit there can be received a disk having a diameter of 12 cm and a disk having a diameter of 8 cm. Also, both a ROM disk and a recordable RAM disk can be accommodated therein. Examples of ROM disks include CD and DVD-ROM, while examples of RAM disks include PD and DVD-RAM. Further, a single CD is an example of a disk having a diameter of 8 cm.

As shown in FIG. 3, a memory board M as an example of the discriminating means is provided on an inner surface side of a bottom 1$e$ of the disk package P. The memory board M is formed by fixing a memory element 2 onto a printed circuit board 5 which has a printed wiring of copper foil, for example. The printed circuit board 5 is provided with connection terminals 3 for connection between the memory element 2 and the exterior. The connection terminals 3 are exposed to the exterior from a rectangular hole 1$f$ formed in the bottom 1$e$. The memory element 2 of the memory board M is, for example, an electrically writable RAM type IC chip which stores the types of all the disks D housed within the disk package P and index information of each disk package P.

As shown in FIG. 3, two guide grooves 4 are formed respectively in X and Y directions in the bottom 1$e$ of the disk package P. The guide groove 4 formed in X direction is used when the disk package P is inserted in X1 direction into the body of the device (the disk unit), as shown in FIG. 1, while the guide groove 4 formed in Y direction is for a disk unit of the type in which the disk package P is inserted in Y1 direction. At the front ends (X1 and Y1 sides in the figure) of the guide grooves 4, 4 are respectively formed expanded portions 4$a$ each defined by slant portions 4$a$1 and 4$a$2. Further, lock grooves 4$b$ are formed in the innermost portions on X2 and Y2 sides, respectively.

The disk package P containing various disks D is inserted and loaded into the disk loading area B through the insertion port A1 of the housing A shown in FIGS. 1 and 2.

Figure 4:
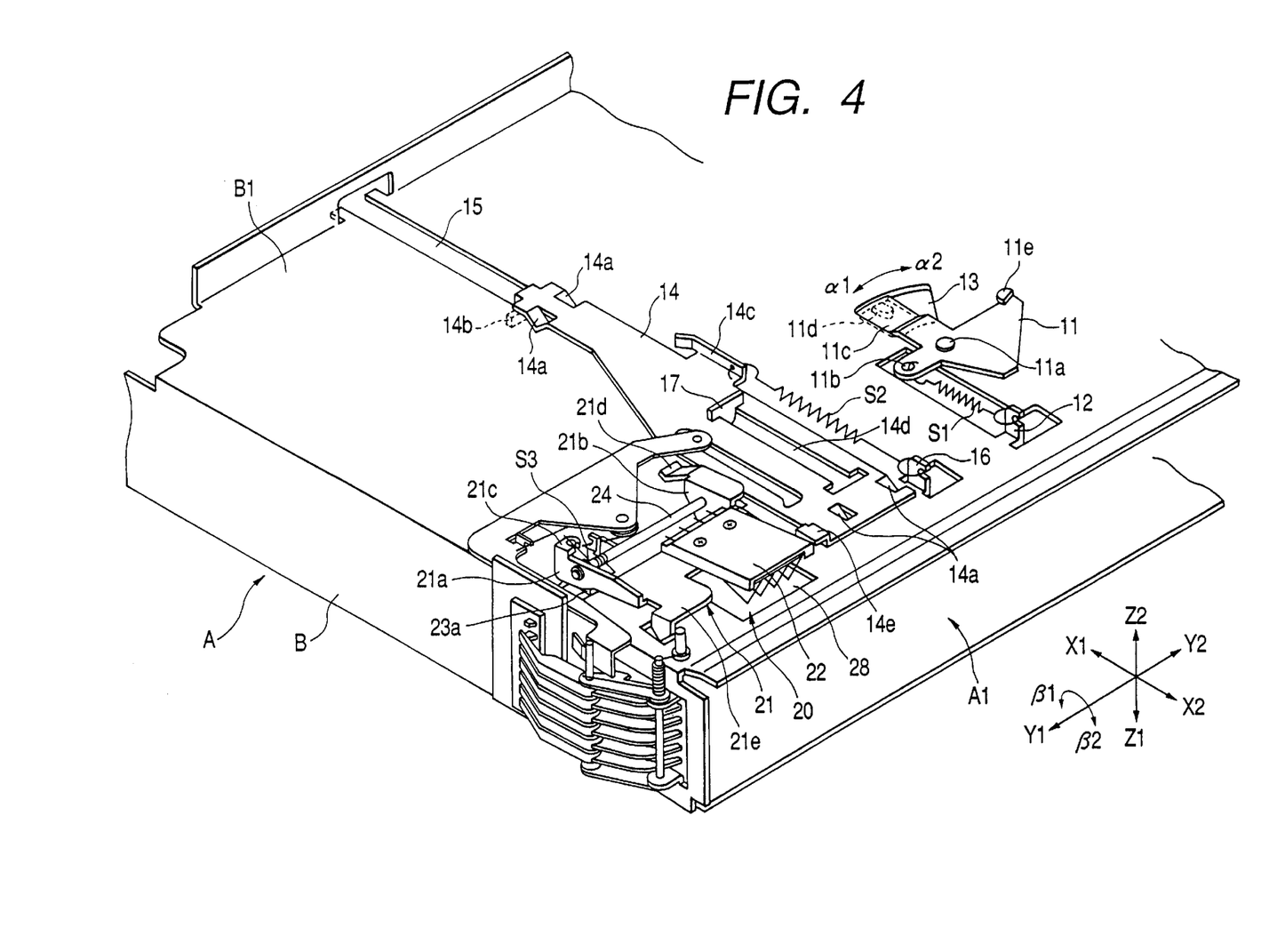
FIG. 4 is a perspective view of a mechanical structure on the back side of a package loading area.

FIG. 4 is a perspective view showing a mechanical structure from the bottom side (back side) of the disk unit which mechanical structure is provided on the bottom of the package loading area of the housing.

The numeral 11 appearing in FIG. 4 denotes a lock member formed by injection molding of a synthetic resin for example. The lock member 11 is rotatable about a support shaft 11a as fulcrum. An urging member S1 such as, for example, a coiled spring is stretched between a hole 11b formed in the lock member 11 and a retaining portion 12 formed by bending from the housing A. With the urging member S1, the lock member 11 is urged in the direction of α1 in the figure. A front end portion 11c of the lock member 11 is bent in Z1 direction in the figure and is inserted into a sectorial hole 13 formed in the housing A. Further, a generally triangular projection 11d is integral with the front end portion 11c and is projecting in Z1 direction into the package loading area B for the disk package P.

On the bottom, indicated at B1, of the package loading area B of the housing A is mounted a moving plate 14 serving as both a moving member and an eject member. The moving plate 14, which is formed by pressing a metallic plate, is movable on the bottom B1 in X direction in the figure through four slide portions 14a which are formed in V shape by molding on end sides in both X1 and X2 directions.

At an end portion in X1 direction of the moving plate 14 is formed a receiving portion 14b which is bent in T shape in Z1 direction in the figure. The receiving portion 14b is inserted in to a guide groove 15 formed in the bottom B1. In the moving plate 14 is formed a guide slot 14d, into which is inserted a T-shaped projection 17 which is formed by bending from the bottom B1. Therefore, the moving plate 14 can move linearly in X direction along the guide slots 15 and 14d.

At a corner in X2 and Y1 directions in the figure of the moving plate 14 is formed a push-up piece 14e by bending, which can come into abutment with a to-be-pushed-up portion 21d of a contact mechanism portion 20 to be described later. An urging member (eject urging member) S2 such as, for example, a coiled spring is stretched between a retaining hole 14c formed in the moving plate 14 and a retaining portion 16 formed by bending from the bottom B1 of the package loading area B. With an urging force of the urging member S2, the moving plate 14 is urged in X2 direction in the figure at all times.

At one corner of the bottom B1 of the package loading area B is provided a contact mechanism portion 20, which comprises a rotary member 21 and a contact support member 22 fixed to the rotary member. The rotary member 21, which is formed by bending a metallic plate or the like in a generally U-shape, is provided at both ends thereof with upright pieces 21a, 21b, a retaining portion 21c and the to-be-pushed-up portion 21d. The upright pieces 21a and 21b are rotatably supported on a rotating shaft 24 which is mounted horizontally between support pieces 23a and 23b (see FIG. 8) formed by bending from the bottom B1. Between the upright pieces 21a and 21b is formed a mounting portion 21e which extends in X2 direction in the figure with respect to the rotating shaft 24. Within the area of the mounting portion 21e, the contact support member 22 is fixed to the mounting portion with screws or the like.

Between the retaining portion 21c, which is bent from the upright piece 21a, and the bottomplate B1 is stretched an urging member S3 such as, for example, a coiled spring. With a restoring force of the urging member S3, the contact support member 22 (mounting portion 21e) side of the contact mechanism portion 20 is urged continually about the rotating shaft 24 in a direction (β1 direction in the figure) away from the bottom plate B1.

Figure 5A:
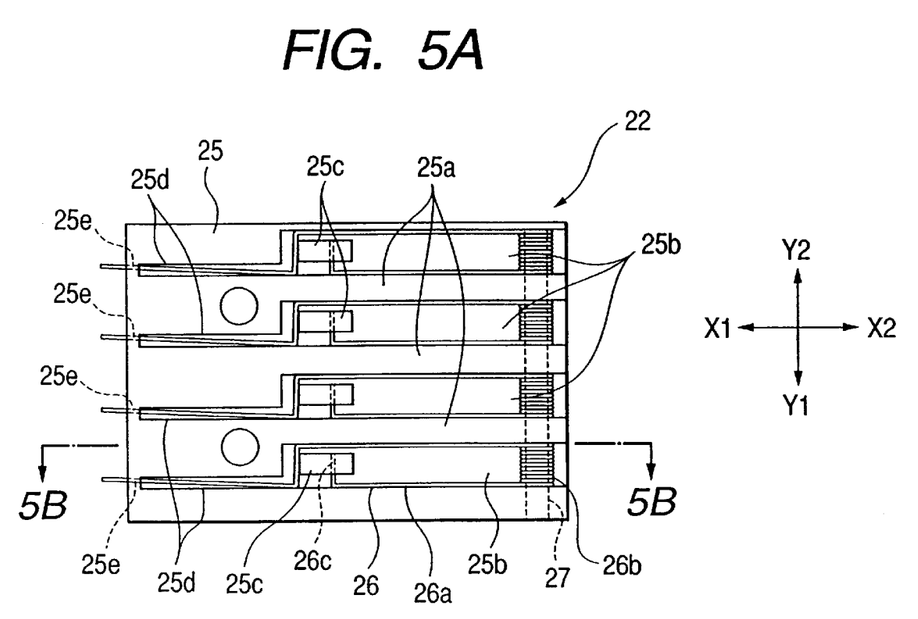
FIG. 5A is a plan view of a contact mechanism portion.
Figure 5B:
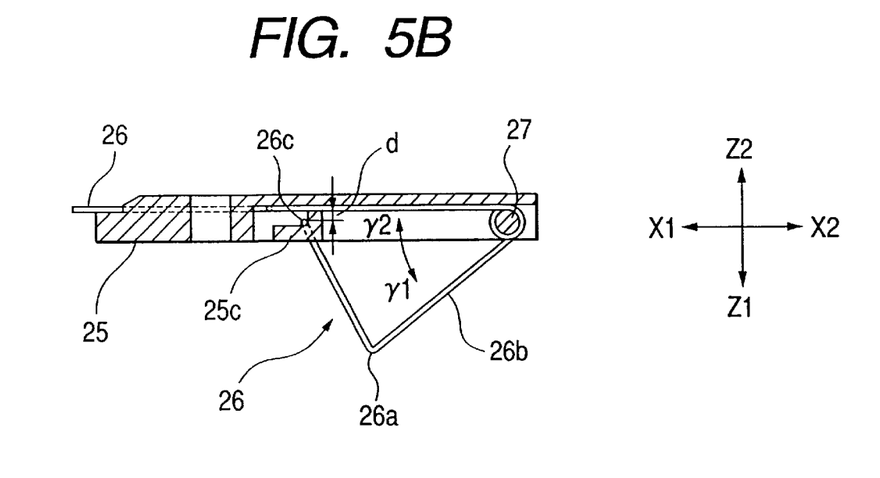
FIG. 5B is a sectional view taken on line 5B—5B in FIG. 5A.

FIG. 5 shows an example of a contact terminal, in which FIG. 5A is a plan view and FIG. 5B is a sectional view taken on line 5B—5B in FIG. 5A.

The contact support member 22 shown in FIG. 5 comprises a base 25 formed by, for example, injection molding of a resin material having an electrical insulating property and conductors 26 each obtained by plating an elastic wire with gold for example. In the base 25 are defined a plurality of compartments 25b by a plurality of partition walls 25a which are formed in X direction in the figure. A support shaft 27, which extends in Y axis direction, is inserted through X2-side end portions of the partition walls 25.

As shown in FIG. 5B, each conductor 26 is formed with a torsion spring portion 26b. One side of each conductor 26 with respect to the torsion spring portion 26b is bent in a triangular shape having a contact 26a at the top thereof and also having a retaining portion 26c formed by bending at an end thereof. The torsion spring portion 26b is fitted on the support shaft 27 and the retaining portion 26c is engaged with a retaining piece 25c which is integral with the base 25. The other side of the conductor 26 is guided along a groove 25d formed in the base 25 and is exposed in X1 direction in the figure through an insertion hole 25e formed on an extension line of the groove 25d. The end portion of the conductor 26 exposed from the insertion hole 25e is connected through a distribution cable or the like to an electric circuitry (not shown) of, for example, a computer disposed within the disk unit.

The contact 26a of each conductor 26 laid on the base 25 is urged continually in γ1 direction in the figure with the urging force of the torsion spring portion 26b. Further, a gap d as a margin for movement is formed between the retaining piece 25c formed in the retaining portion 26c and the base 25. When the contact 26a of the conductor 26 is pressed in Z2 direction in the figure, the retaining piece 25c becomes movable by a distance corresponding to the gap d so that the triangular shape of the conductor 26 can be deformed in a direction (γ2 direction in the figure) opposite to the biasing direction of the torsion spring portion 26b.

The following description is now provided about the operation of the disk unit constructed as above.

Figure 6:
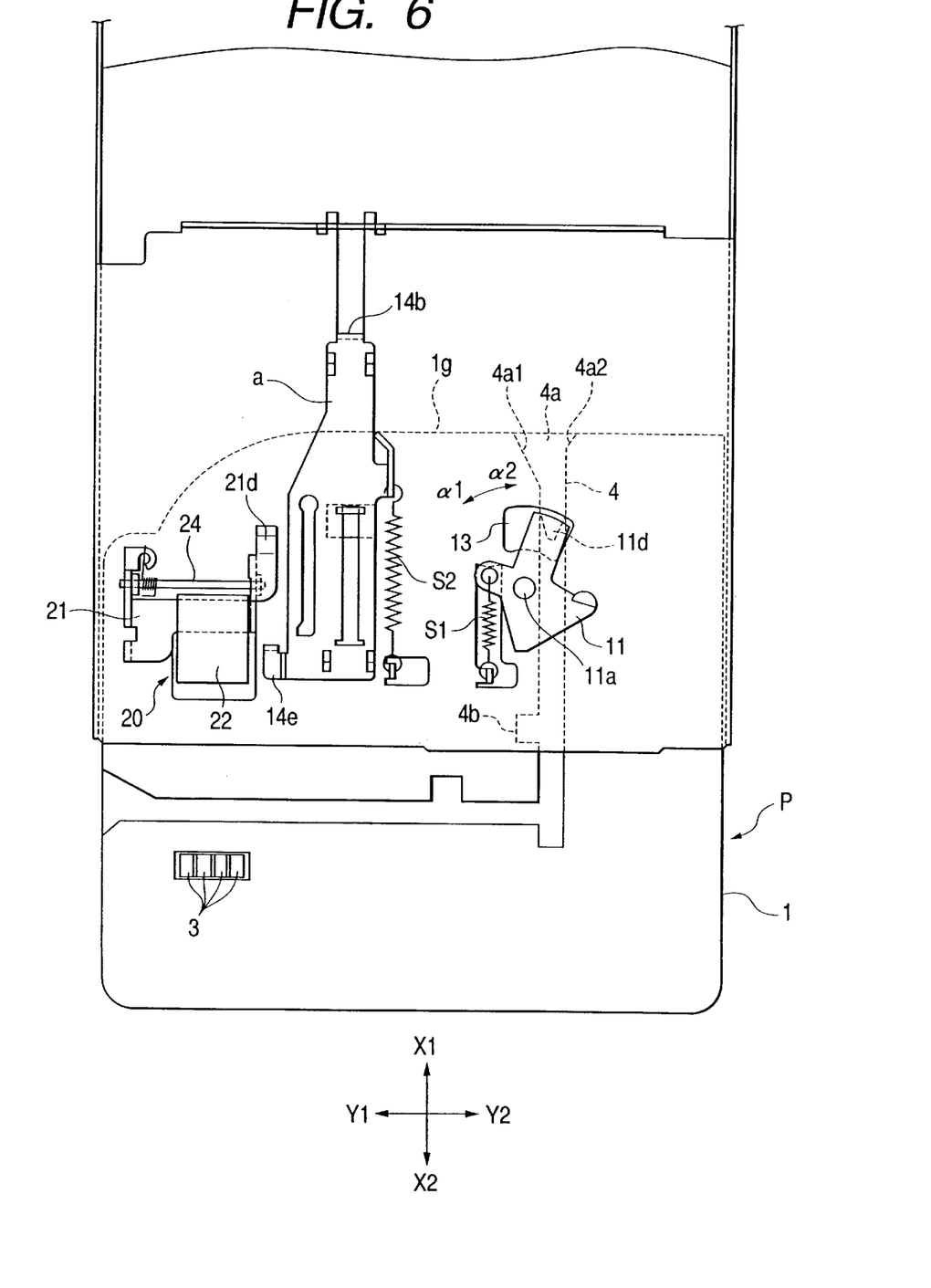
FIG. 6 is a bottom view showing the disk package being inserted into the disk unit.
Figure 7:
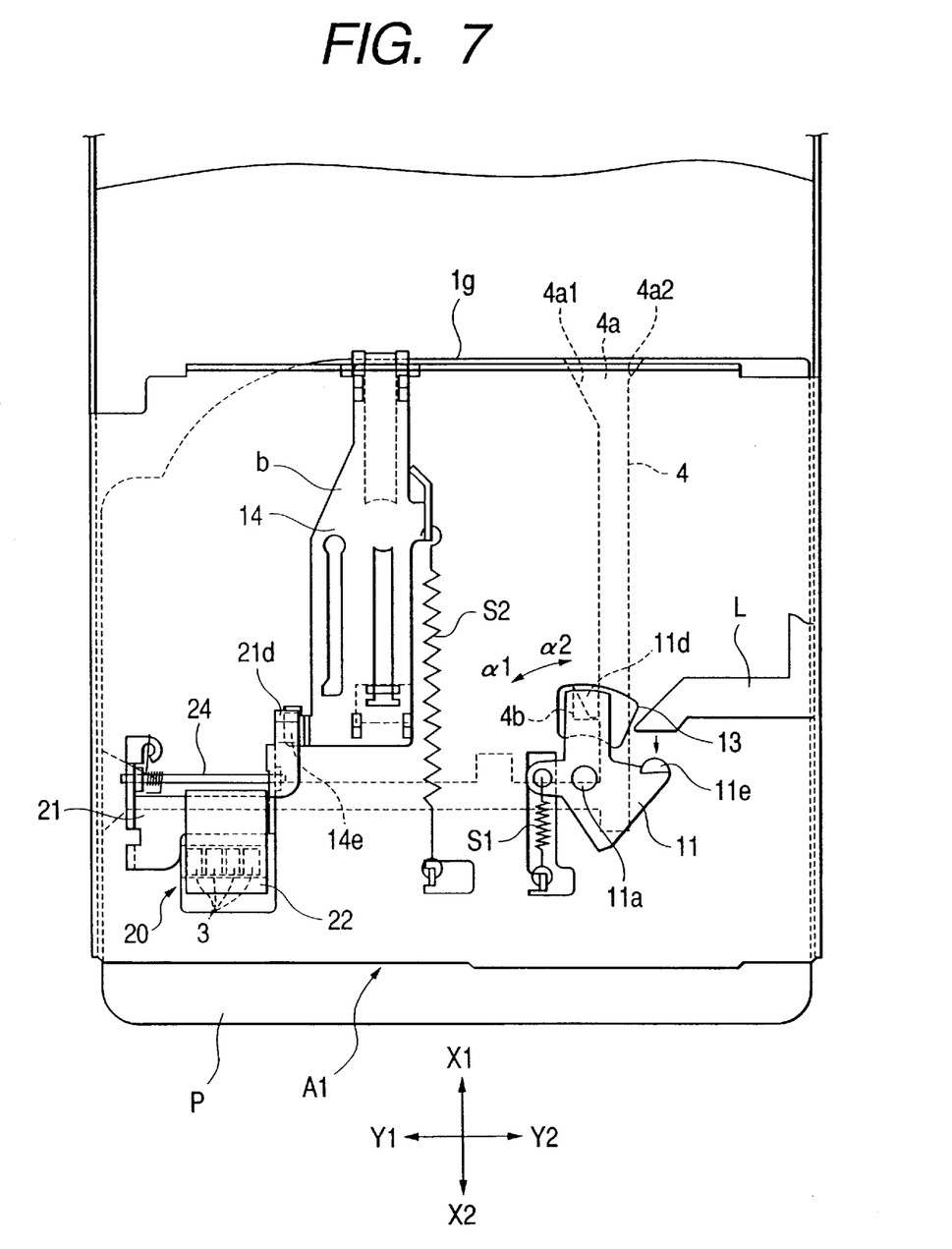
FIG. 7 is a bottom view showing a completely loaded state of the disk package.

FIG. 6 is a bottom view showing the disk package being inserted and FIG. 7 is a bottom view showing a completely loaded state of the disk package.

As shown in FIG. 2, the disk package P is inserted in X1 direction from the insertion port A1 of the housing A. At this time, the bottom 1e of the disk package P and the bottom B1 of the package loading area are in the following relation. When the disk package P is inserted into the insertion port A1, the generally triangular projection 11d of the lock member 11 comes into abutment with the inclined portion 4a1 as a constituent of the expanded portion 4a shown in FIG. 3. The projection 11d then turns in α2 direction along the inclined portion 4a1 in FIG. 4 and goes into such an unlocked state as shown in FIG. 6. With further insertion of the disk package P, the projection 11d moves along a guide groove 4 and reaches the associated lock groove 4b. Then, as shown in FIG. 7, the lock member 11 is turned in α1 direction with the urging force of the urging member S1, so that the projection 11d gets into the lock groove 4b and assumes a locked state. With this lock mechanism, the disk package P is locked and the loading thereof into the package loading area B is completed.

Before insertion of the disk package P, as shown in FIG. 4, the moving plate 14 is urged with the urging member S2 and is positioned on the most X2 side indicated at (a) in FIG.

6. When the disk package P enters the package loading area B, an edge portion 1g of the case 1 comes into abutment with the receiving portion 14b of the moving plate 14. As the disk package P is further inserted into the disk unit, the edge portion 1g pushes the receiving portion 14b to the inner part of the package loading area B, so that the moving plate 14 is moved in X1 direction opposite to the biasing direction of the urging member S2. In a completely loaded state of the disk package P, the moving plate 14 reaches its position indicated at (b) in FIG. 7.

Figure 8A:
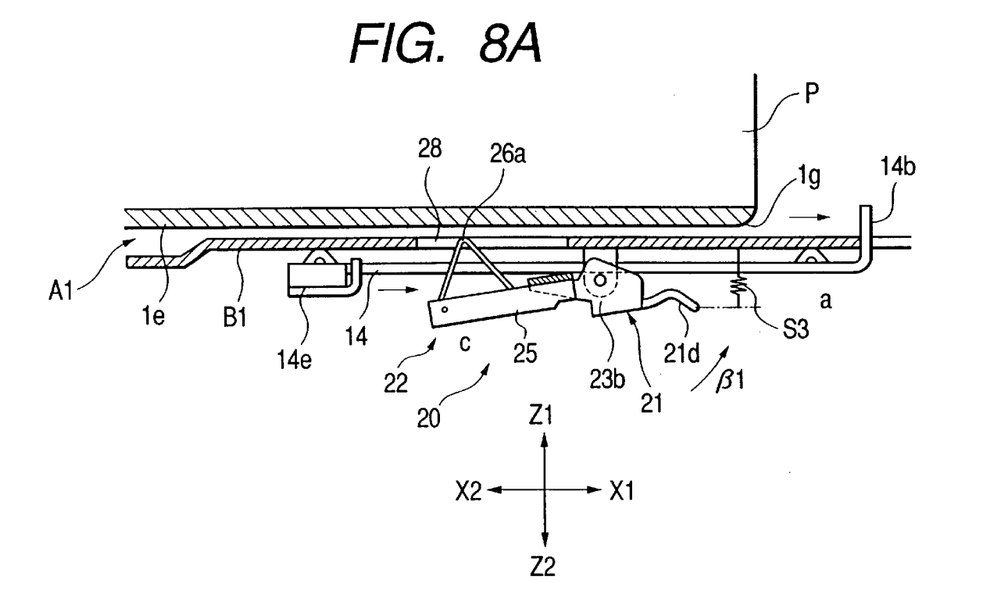
FIG. 8A is a partial sectional view showing the disk package being inserted into the disk unit and FIG. 8B is a partial sectional view showing a completely loaded state of the disk package.
Figure 8B:
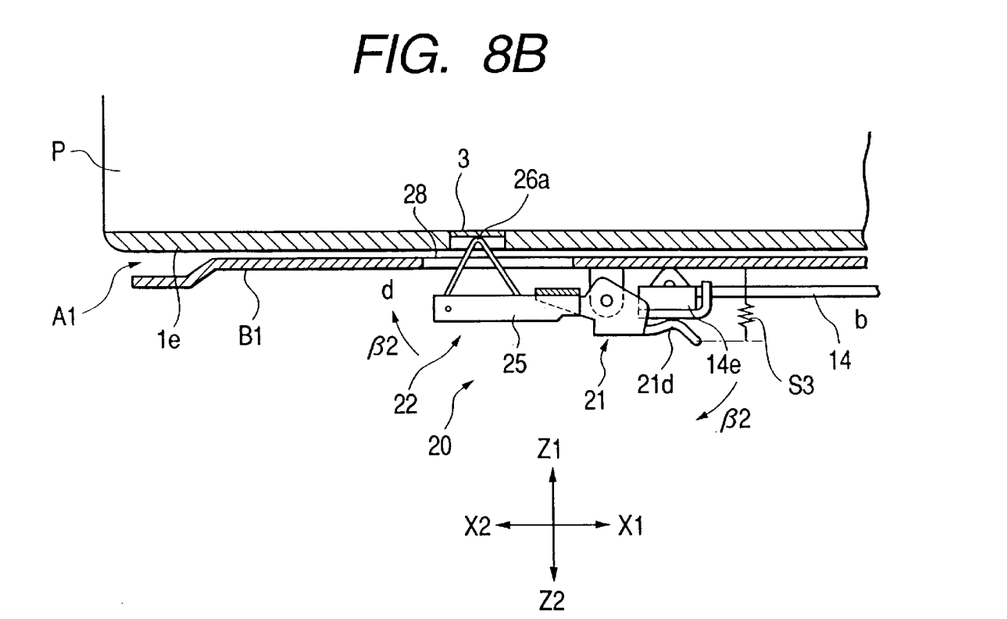

FIG. 8A is a partial sectional view showing the disk package being inserted and FIG. 8B is a partial sectional view showing a completely loaded state of the disk package.

As the moving plate 14 moves in X1 direction, the push-up piece 14e also moves in the same direction. As shown in FIGS. 6 and 7, at the position where the push-up piece 14e arrives there is positioned the to-be-pushed-up portion 21d of the rotary member 21 in the contact mechanism portion 20 described above.

As shown in FIG. 8A, when the moving plate 14 is located at the position (a), the rotary member 21 is urged and rotates in β2 direction under the action of the urging member S3, and the base 25 of the contact support member 22 turns in β1 direction. The contact 26a is in a stand-by position spaced apart from the wall surface of the disk package P being inserted. At this time, the to-be-pushed-up portion 21d assumes the state indicated at (c) in which it is close to the bottom B1 (in Z1 direction) of the package loading area B.

Then, as shown in FIG. 8B, immediately before the loading of the disk package P is completed, the push-up piece 14e gets in between the bottom B1 and the to-be-pushed-up portion 21d and pushes the to-be-pushed-up portion in Z2 direction. Consequently, the rotary member 21 is turned in β2 direction and hence the base 25 fixed to the mounting portion 21e reaches the connecting position (d) close to the bottom B1. As shown in FIGS. 4 and 8, a square hole 28 is formed in the bottom B1 at a position opposed to the base 25, and the contact 26a of the each conductor 26 moves toward the disk package P (in Z1 direction) through the square hole 28.

On the other hand, when the loading of the disk package P into the package loading area B is completed, as shown in FIG. 7, the connection terminals 3 formed exposedly on the bottom 1e of the disk package are positioned in opposition to the base 25 and the square hole 28. Further, as shown in FIG. 8B, the connection terminals 3 are opposed to the rotated positions of the contacts 26a of the conductors 26. The terminals 3 and contacts 26a come into contact with each other. As noted previously, the conductors 26 are each deformable elastically in Z1 direction through the torsion spring portion 26b and the gap d (see FIG. 5). That is, an electrical connection is ensured by elastic contact of the contacts 26a with the connection terminals 3.

Ejection of the disk package P is performed in the following manner. The package ejection is started by operating an eject button provided in an operating panel of the disk unit or in a remote controller. Once the eject button is pushed, an unlocking lever L shown in FIG. 7 is moved in X2 direction by means of an unlocking mechanism portion (not shown) and pushes the projection 11e of the lock member 11. Consequently, the lock member is turned in α2 direction, so that the projection 11d becomes disengaged from the associated lock groove 4d and the disk package P is unlocked. Then, with the restoring force of the urging member S2, the moving plate 14 is moved in X2 direction, so that the receiving portion 14b formed at the front end of the moving plate 14 pushes the edge portion 1g of the case 1 in X2 direction. As the moving plate 14 moves from the position (b) to the position (a), the disk package P is ejected to the insertion port A1 side.

At this time, the pushing force of the push-up piece 14e against the to-be-pushed-up portion 21d is also released, so that with the restoring force of the urging member S3 the contact mechanism portion 20 shifts from the state (d) to the state (c). Consequently, each contact 26a is also spaced away from the associated connection terminal 3 and hence the electrical connection between the two is broken, thus permitting ejection of the disk package P.

In the above disk package loading operation, the rotating motion of the contact mechanism portion 20 ends immediately before complete loading of the disk package P and the contact 26a comes into abutment with the connection terminal 3 prior to completion of the package loading. For example, this can be achieved by forming the push-up piece 14e in a slightly extended shape in X1 direction or by slightly shifting the rotating shaft 24 of the contact mechanism portion 20 toward X2 side, allowing the push-up piece 14e to abut the to-be-pushed-up portion 21d slightly earlier. Alternatively, the length of the contact 26a may be made a little longer to increase the degree of projection thereof.

By setting as above, the contacts 26a slide a very short distance on the connection terminals 3, so that both are rubbed against each other, thereby making the formation of metallic oxide films and stain of the contacts difficult and allowing self-cleaning of the contacts 26a and connection terminals 3 to be carried out. Besides, even if dust or the like is deposited on the contacts 26a and the connection terminals 3, the sliding motion permits removal thereof. Therefore, it becomes possible to prevent the occurrence of electrical inconveniences such as contact defect and it becomes possible to make access to the foregoing memory board M in a satisfactory manner. Consequently, it is possible to accurately detect the type of each RAM or ROM disk contained in the disk package as well as index information such as TOC data.

Since the disk package can be loaded while allowing cleaning of the lock mechanism and contacts to be done manually, it is possible to omit such drive members as a motor and a solenoid.

There may be adopted a modification in which the disk package is slightly moved back with a spring pressure or the like from the time when it has been inserted completely and this movement of the disk package causes a sliding motion of the contacts and the connection terminals.

In the recording medium loading device according to the present invention, as set forth hereinabove, when the package is loaded, the contacts on the device body side move away from the connection terminals of the package, and when the package has been loaded, the contacts and the connection terminals come into contact with each other. Therefore, at the time of loading and ejection of the package, the contacting force of the contacts does not act as a load. Particularly, where the package is inserted in the longitudinal direction, the contacts do not slide a long distance on the package wall surface and hence there is no fear of the contacts being stained by the package wall surface.

Further, since the package moves slightly in a contacted state of the contacts with the connection terminals, there is performed self-cleaning between the contacts and the connection terminals.

What is claimed is:

1. A recording medium loading device, in which a connection terminal for connection with an exterior is provided on a package within which a recording medium is housed, and the package is capable of being loaded into or unloaded from a main body of the device, wherein in the main body is provided a contact support member having a contact, said contact support member being biased by a biasing mechanism at a waiting position where said contact is not in contact with said package in a midway part of loading said package and moved to a connecting position in which said contact is brought into contact with said connection terminal upon one of completion of loading of said package and just before completion of loading of said package, the main body of said device is provided with a moving member moved in cooperation with loading of said package, said moving member pressing said contact support member while opposing a biasing force of said biasing mechanism upon one of completion of loading of said package and just before completion of loading of said package and moving said contact support member to said connection terminal.

2. A recording medium loading device according to claim 1, wherein a disk as the recording medium is contained in the package, and the package is provided with a discriminating mechanism having said connection terminal to detect one of a type of disk and recorded contents of the disk.

3. A recording medium loading device according to claim 2, wherein the discriminating mechanism has a memory element.

4. A recording medium loading device according to claim 1, wherein a plurality of disks as recording mediums are contained in the package, and the package is provided with a discriminating mechanism having said connection terminal to detect one of a type of each said disk and recorded contents of the disk.

5. A recording medium loading device according to claim 4, wherein the discriminating mechanism has a memory element.

6. A recording medium loading device according to claim 1, wherein said contact and said contact support member are opposed to a position where one side of the package to be loaded passes, said contact support member moves to said connecting position immediately before loading of the package into the device body is completed, and said contact and said connection terminal slide with respect to each other with a final loading motion of the package after contact of the contact and said connection terminal.

7. A recording medium loading device according to claim 6, wherein said moving member moves by being pushed by the package to be loaded and functions as an eject member for ejecting the package in an ejecting direction when the package is unlocked after loading.

8. A recording medium loading device according to claim 1, wherein said contact support member is energized by an energizing member at a retracted position and is pushed to a connecting position by said moving member when the loading of said package is completed or immediately before the completion of the loading thereof.

9. A recording medium loading device according to claim 1, in which said moving member is pushed by said package when said package is loaded, moved from an insertion opening side of said package to a deeper side, a turning member is rotatably supported at a rotating shaft arranged at a bottom part of said main body, said contact support member is arranged at one side holding said rotating shaft of said rotating member, a pushed part pressed by said moving member is formed at another side, said biasing member biases one side of said turning member in a direction moving away from said package, said moving member presses said pushed part against the biasing force of said biasing member upon one of completion of loading of said package and just before completion of loading of said package, thereby one side of said turning member is moved in a direction approaching said package and the contact of said contact support member is brought into contact with the connection terminal of said package.

10. A recording medium loading device according to claim 1, wherein said contact support member has a plurality of conductor lines arranged side by side in a predetermined space on a resin base member, one side of each of said conductor lines is bent into a triangular shape to form a contact such that each of the plurality of conductor lines is resiliently deformable and a wiring cable is connected to another side of each of said conductor lines.

11. A recording medium loading device according to claim 10, wherein each of said conductive lines has a multi-wound portion disposed in a midway section, the multi-wound portions have resiliency, and said multi-wound portions are fitted to a support shaft arranged at said base member, thereby fixing each of said conductor lines to said base member.

* * * * *

UNITED STATES PATENT AND TRADEMARK OFFICE
CERTIFICATE OF CORRECTION

PATENT NO. : 6,188,663 B1
DATED : February 13, 2001
INVENTOR(S) : Keisuke Nakayama Page 1 of 1

It is certified that error appears in the above-identified patent and that said Letters Patent is hereby corrected as shown below:

<u>Title page,</u>
<u>Column 2,</u>
Line 3, delete "(WO)" and substitute -- (PCT) -- in its place.

<u>Column 10,</u>
Line 33, delete "is" and substitute -- are -- in its place.

Signed and Sealed this

Twenty-eighth Day of May, 2002

Attest:

JAMES E. ROGAN
*Attesting Officer*     *Director of the United States Patent and Trademark Office*